United States Patent
Kendrick

(10) Patent No.: US 7,407,701 B2
(45) Date of Patent: Aug. 5, 2008

(54) LOFTED COMPOSITE WITH ENHANCED AIR PERMEABILITY

(75) Inventor: Richard D Kendrick, Stamford, CT (US)

(73) Assignee: KX Technologies LLC, Orange, CT (US)

( * ) Notice: Subject to any disclaimer, the term of this patent is extended or adjusted under 35 U.S.C. 154(b) by 349 days.

(21) Appl. No.: 11/189,686

(22) Filed: Jul. 26, 2005

(65) Prior Publication Data
US 2006/0024484 A1    Feb. 2, 2006

Related U.S. Application Data

(60) Provisional application No. 60/592,733, filed on Jul. 30, 2004.

(51) Int. Cl.
*B32B 27/04*    (2006.01)
(52) U.S. Cl. .................... 428/297.1; 442/393
(58) Field of Classification Search ............... 442/375, 442/365, 393; 604/378; 96/153, 142; 210/502.1, 210/505, 507; 55/486, 498; 428/297.1, 297.7, 428/393, 292.1
See application file for complete search history.

(56) References Cited

U.S. PATENT DOCUMENTS

| | | | | |
|---|---|---|---|---|
| 4,540,625 A | * | 9/1985 | Sherwood | .................... 442/365 |
| 4,699,823 A | * | 10/1987 | Kellenberger et al. | ........ 428/219 |
| 4,868,032 A | * | 9/1989 | Eian et al. | .................... 428/198 |
| 4,902,559 A | * | 2/1990 | Eschwey et al. | ............. 442/334 |
| 4,950,531 A | * | 8/1990 | Radwanski et al. | ......... 442/351 |
| 5,043,206 A | * | 8/1991 | Ternstrom | .................... 428/218 |
| 5,043,209 A | * | 8/1991 | Boisse et al. | ................. 442/397 |
| 5,135,787 A | * | 8/1992 | Bair | .......................... 428/36.1 |
| 5,230,959 A | * | 7/1993 | Young et al. | ................. 428/372 |
| 5,378,528 A | * | 1/1995 | Makoui | ...................... 428/219 |
| 5,486,410 A | * | 1/1996 | Groeger et al. | .............. 442/353 |
| 5,580,459 A | * | 12/1996 | Powers et al. | ............... 210/634 |
| 5,597,645 A | * | 1/1997 | Pike et al. | ...................... 96/99 |
| 5,662,728 A | * | 9/1997 | Groeger | ....................... 96/153 |
| 5,681,361 A | * | 10/1997 | Sanders, Jr. | .................. 51/295 |
| 5,792,513 A | * | 8/1998 | Koslow et al. | .............. 427/195 |
| 5,906,743 A | * | 5/1999 | Cohen et al. | .............. 210/502.1 |
| 6,102,039 A | * | 8/2000 | Springett et al. | ....... 128/206.12 |
| 6,479,415 B1 | * | 11/2002 | Erspamer et al. | ............. 442/381 |
| 6,562,742 B2 | * | 5/2003 | Dutkiewicz et al. | ......... 442/375 |
| 7,176,149 B2 | * | 2/2007 | Dutkiewicz et al. | ......... 442/375 |
| 2004/0214495 A1 | * | 10/2004 | Foss et al. | .................... 442/199 |
| 2006/0024484 A1 | * | 2/2006 | Kendrick | ................. 428/292.1 |

* cited by examiner

*Primary Examiner*—N Edwards
(74) *Attorney, Agent, or Firm*—DeLio & Peterson, LLC; Kelly M. Nowak

(57) ABSTRACT

A composite of the present invention comprises a substrate having deposited on a surface thereof a dry mixture of active particles, lofting fibers, and binder particles. The composite has increased air permeability and lower air resistance than prior art composites that do not incorporate lofting fibers.

20 Claims, 1 Drawing Sheet

LOFTED COMPOSITE WITH ENHANCED AIR PERMEABILITY

This invention is directed to a composite flat sheet structure having active particles, lofting fibers, and binder particles contained therein, such composite being useful in fluid filtration applications where enhanced air permeability of the composite is advantageous.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

DETAILED DESCRIPTION OF THE PREFERRED EMBODIMENT(S)

Figure 1:
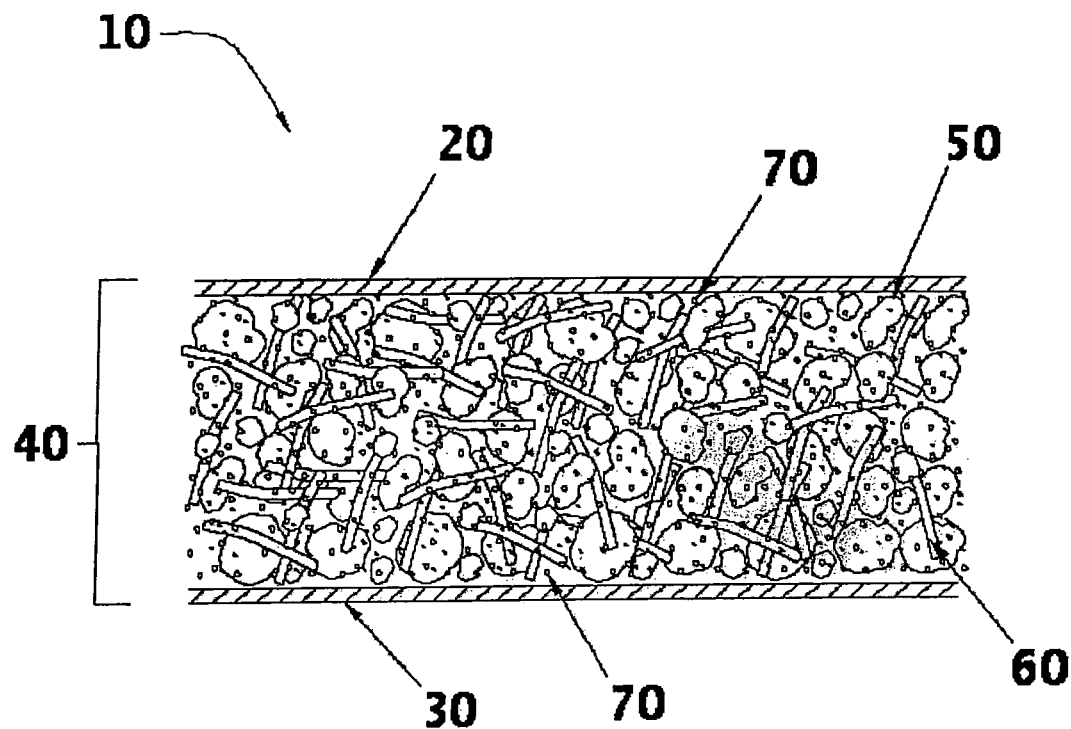
FIG. 1 is a cross sectional view of a composite of the present invention.

In describing the preferred embodiment of the present invention, reference will be made herein to FIG. 1 of the drawings in which like numerals refer to like features of the invention. Features of the invention are not necessarily shown to scale in the drawings.

The composite of the present invention includes a dry mixture of lofting fibers, active particles, and binder particles deposited onto the surface of discrete substrate, wherein the composite is heated to the softening temperature of the binder particles, but below the melting temperature of the lofting fibers or active particles, to coalesce the active particles and the lofting fibers to each other and to the discrete substrate. By incorporating high denier lofting fibers within the composite that do not substantially bend around the active particles, the lofting fibers provide greater than about 20% increase in air permeability without sacrificing the kinetics of the composite, and significant reductions in air resistance. Preferably, the air permeability of a composite of the present invention is greater than about 200 scfm at 0.5 inches water column.

The composite is a flat sheet structure that has excellent adsorptive or absorptive capacity provided by high loading rates of the active particles. The small size of the binder particles causes the binder particles to adhere to the active particles and the lofting fibers by electrostatic and van der Waal forces yet preserve a majority of the surface area of the active particles for optimal kinetics. In addition to their tendency to stick to the active particles and lofting fibers, the binder particles also have a high innate cohesion.

The flat sheet composites of the present invention are useful in fluid filtration applications, particularly as air filters in heating, ventilation, air conditioning (HVAC) systems for buildings, automobile air filters, and water or other liquid filtration applications. The flat sheet composites can be pleated, spiral wound, or both pleated and spiral wound.

Preferably, the composite of the present invention is made using a continuous process to achieve economies of scale and low cost, and can be produced as roll goods. Subsequent cutting, slitting and/or pleating operations may also be made in-line.

The substrate used in the composite of the present invention can be any discrete flat sheet structure including, but not limited to, webbing, paper, tissue, toweling, fabric, and woven or nonwoven materials. The substrate can be relatively fragile or sturdy. Preferably, the substrate can withstand handling by a knurled roller for continuous production of the composite.

A preferred substrate for use in making the composite of the present invention is a nonwoven material having an air permeability of greater than about 600 scfm (static cubic feet/minute), and more preferably greater than about 800 scfm, at about 0.5 inch water column. The extremely high air permeability of the substrate lends itself further to the air permeability in the resulting composite of the present invention.

A most preferred substrate can be a wet or dry laid nonwoven material having a thermoplastic binder. Preferably, the thermoplastic binder is a latex binder present in an amount of about 20% to about 30% by weight, more preferably about 25% by weight. Such a preferred substrate is commercially available from American Nonwovens Corporation, Columbus, Miss., under the trade designation SRF5037B. The nonwoven material may have a basis weight of about 20 to about 25 grams/yard$^2$ although if the resultant composite is to be pleated, it is preferable to increase the basis weight of the nonwoven substrate to about 30 to about 35 grams/yard$^2$ or higher.

One or more types of active particles either in particulate, fiber, whisker, or powder form can be provided in the composite to add functionality and/or reinforcement to the composite of the present invention. Useful types of active particles may include, but are not limited to, metals, metal salts, metal oxides, alumina, carbon, activated carbon, silicates, ceramics, zeolites, diatomaceous earth, activated bauxite, fuller's earth, calcium sulfate, titanium dioxide, magnesia, magnesium hydroxide, manganese oxides, iron oxides, perlite, talc, clay, bone char, calcium hydroxide, calcium salts, or combinations thereof. Such active agents can aid in the adsorption of contaminants such as heavy metals or volatile organic compounds (VOCs). The active agents can also be chemically treated to impart microbiological interception capabilities depending upon the particular application.

The active particles are preferably present in a sufficient amount such that the fluid flow through the composite is not substantially impeded when used as a filter medium. The amount of active particles is also dependent upon the particular use of the composite. Preferably, the active particles are present in an amount of greater than about 80% by weight based on a total weight of the dry mixture to be laid on the substrate, more preferably greater than about 85% by weight. Higher concentrations of active particles, such as up to about 90% by weight, are contemplated and within the scope of the invention. A preferred lay down of the active particles is about 250 grams/meter$^2$ to greater than about 600 grams/meter$^2$. For filtration applications, a preferred lay down may be 370 grams/meter$^2$ to about 450 grams/meter$^2$.

The particle size of the active particles can be about 1 to about 5000 μm. As the size of the active particles decrease, higher loading rates of the active particles in the paper can be obtained. However, in some applications larger particles may be more desirable since the smaller the particle size, the more densely packed the active particles may be within the composite. For an air filtration application with enhanced air permeability, a coconut based carbon having a mesh size of about 20×50 may be preferred.

The lofting fibers in the composite of the present invention preferably have a high denier of greater than about 25, preferably greater than about 30, and more preferably greater than about 45. By using such a high denier fiber to loft the composite, the fibers are more likely to remain substantially straight and rod-like without bending around the active particles to increase air flow around the active particles.

The fibers are preferably easily dispersible without substantial clumping being evident. Therefore, it is advantageous to have a low moisture content of the fibers or the fiber tow of less than or equal to about 5% by weight based on a total weight of the fiber. The fibers or fiber tow may also be treated with a sizing agent to reduce the static charge thereon to further reduce clumping. Such sizing agents are well known in the art.

Preferably, the lofting fibers are present in an amount of about 3% to about 12% by weight based on a total weight of the dry mixture to be laid on the substrate and more preferably about 5 to about 10% by weight, and most preferably about 6% to 8% by weight. It is preferable to chop the fiber tow into fiber lengths of about 6.35 millimeters (0.25 inches) or less, preferably about 3.175 millimeters (0.125 inches). Fibers longer than about 6.35 millimeters may have a tendency to entangle or wrap around the active particles and/or binder particles and may not disperse well when mixed with the active particles and binder.

It is preferable to use fibers that have a high intrinsic strength. Such fibers include, but are not limited to, polymers such as polyester, polyamide, acrylic, acrylonitrile, liquid crystal polymers such as VECTRAN", and the like; metal; glass; ion-exchange resins; engineered resins; or combinations thereof. Combinations of organic and inorganic fibers and/or whiskers are contemplated and within the scope of the invention. For example, glass, ceramic, or metal fibers and polymeric fibers may be used together.

A preferred lofting fiber is a polyester fiber having a denier of about 45, cut to a length of about 6.35 millimeters with a moisture content of less than or equal to about 5% by weight. Such a polyester fiber is commercially available from William Barnet & Son, LLC, of Arcadia, S.C.

The binder is employed to coalesce the active particles and lofting fibers and adhere them to the underlying substrate. For this purpose, the binder must be in the form of very small particles and must be present in a small enough volume that they do not interfere with the function of the active particles nor entangle the lofting fibers. Preferably, the binder will have an effective diameter of not more than 40 microns on average with an optimum size of 20 microns on average. Useful binders include, but are not limited to, polyolefins, polyvinyl halides, polyvinyl esters, polyvinyl ethers, polyvinyl sulfates, polyvinyl phosphates, polyvinyl amines, polyamides, polyimides, polyoxidiazoles, polytriazols, polycarbodiimides, polysulfones, polycarbonates, polyethers, polyarylene oxides, polyesters, polyarylates, phenol-formaldehyde resins, melamine-formaldehyde resins, formaldehyde-ureas, ethyl-vinyl acetate copolymers, copolymers and block interpolymers thereof, and combinations thereof. Variations of the above materials and other useful polymers include the substitution of groups such as hydroxyl, halogen, lower alkyl groups, lower alkoxy groups, monocyclic aryl groups, and the like. Other potentially applicable materials include polymers such as polystyrenes and acrylonitrile-styrene copolymers, styrene-butadiene copolymers, and other non-crystalline or amorphous polymers and structures.

A more detailed list of binders that may be useful in the present invention include end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and polyvinyl fluoride); polyamides, such as poly(6-aminocaproic acid) or poly(6-caprolactam), poly(hexamethylene adipamide), -poly(hexamethylene sebacamide), and poly(11aminoundecanoic acid); polyaramides, such as poly(imino-1,3-phenyleneiminoisophthaloyl) or poly(m-phenylene isophthalamide); parylenes, such as poly-2-xylylene, and poly(chloro-1-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenyl-eneisopropylidene-1, 4-phenylene), and poly(sulfonyl-1,4-phenylene-oxy-1,4-phenylenesulfonyl4,4'-biphenylene); polycarbonates, such as poly-(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexyl-ene-1,4-dimethylene terephthalate) or poly(oxymethylene-1,4-cyclohexylenemethyleneoxy-terephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; and copolymers of the foregoing, such as acrylonitrilebutadiene-styrene (ABS) copolymers. Polyolefins that may be useful include polyethylene, linear low density polyethylene, polypropylene, poly(1-butene), poly(2-butene), poly(1-pentene), poly(2-pentene), poly(3-methyl-1-pentene), poly(4-methyl-1-pentene), and the like.

Examples of suitable binders are MICROTHENE® F, microfine polyolefin powders produced by Quantum Chemical Company, Cincinnati, Ohio, such as, for example, their low density polyethylene sold under the trade designation FN-510, and their ethylene-vinyl acetate copolymer sold under the trade designation FE-532. Preferably, the binder is present in an amount sufficient to effectively coalesce the lofting fibers and the active particles to each other and to the underlying substrate without interfering with the adsorptive or absorptive capacity of the active particles. In a composite with a lay down of about 370 to about 450 grams/meter$^2$, the binder is present in an amount of about 7% to 9% by weight based on a total weight of the dry mixture.

The composite of the present invention is preferably made using a dry laid, continuous process such as that disclosed in U.S. Pat. No. 5,792,513. Typically, a supply roll provides the substrate to be treated. Downstream from the substrate supply roll is a knurled roller positioned to receive the dry mixture of active particles, lofting fibers, and binder particles from a hopper, and apply the dry mixture to the upper surface of the substrate.

The dry mixture is preferably made by mixing the active particles, such as activated carbon, with the lofting fibers. By mixing the active particles and lofting fibers together without the binder particles, greater dispersion of the fibers can be obtained within the active particles because the weight and structure of the active particles dissipates the static charge on the fibers. To further improve fiber dispersion, it is preferable for the fibers to have a low moisture content, such as less than or equal to 5% by weight moisture. When using activated carbon, care should be taken so as not to crush or shear the activated carbon during mixing. For example, a ribbon blender such as a Forberg ribbon mixer, available from Forberg International AS, Larvik, Norway, can be used to mix the active particles and lofting fibers. The binder is then added to the mixture of active particles and lofting fibers.

The surface of the knurled roller may be designed to provide a substantially continuous coating or, alternatively, a coating of a specific design such as, for example, stripes on the substrate surface. A brush or other device may be employed to aid in removing the dry mixture from the knurled roller. Thereafter, the substrate is passed through a nip between an idler roller and a drive roller with heating. Either or both the idler roller and the drive roller can be heated. A pneumatic cylinder is connected via a rod to the axle of the idler roller to maintain a desired pressure on the web within the nip. The clearance between the idler roller and the drive roller can be fixed to a desired thickness of the composite to preserve the lofting the qualities provided by the fibers.

In passing over the surface of the one or more heated rollers, the composite is heated to a temperature equal to or slightly greater than the softening temperature of the binder particles as the composite enters the nip between the idler roller and the drive roller. Within this nip the binder material fuses with the active material and with the material of the web under minimal pressure. Alternatively, the binder may be heated by sending the composite through a laminator. Such laminators are known in the art.

By heating the binder to its softening temperature, the binder particles become tacky without flowing into or fouling the active surfaces of the active particles, nor does it hinder the lofting effect of the fibers in the dry mixture. Heating the composite to a temperature substantially greater than the softening temperature of the binder may adversely effect the lofting fibers causing the fibers to soften or deform. It is preferable for the lofting fibers to remain intact and substantially rod-like.

A second substrate which may be of the same or a different material from that of the underlying substrate may be added as a top sheet to the composite. This second substrate is fed from another supply roll and is also passed between the nip of the rollers and on the top of the dry mixture to which it is being fused, or if a laminator is used, supplied onto the top of the composite prior to entering the laminator. Accordingly, the resultant composite that leaves the roller or laminator has a top and bottom sheet, film, or nonwoven layer such that the dry mixture is sandwiched there between. Upon leaving the nip, the binder particles cool and harden, thereby forming the desired composite. Heating to higher temperatures can adversely affect the underlying substrate.

The composite can be passed onto a take-up roll to be sold as roll goods, or subsequently cut or stamped to size, and/or pleated. When pleating the composite, depending upon the specific application, it may be desirable to use a substrate that has a higher basis weight, for example about 30 to 35 grams/yard$^2$ or higher. However, a higher basis weight of the substrate may reduce the air permeability of the resulting composite. One of skill in the art can determine whether the decrease in air permeability is critical to the specific application.

The composite of the present invention is useful in fluid filtration applications, in particular air filtration applications where high air permeability is desirable without sacrificing or diminishing the kinetics of the active particles, and with increased loading of the active particles.

EXAMPLES/TESTING

The following examples are provided to illustrate the present invention and should not be construed as limiting the scope of the invention.

Aerosol interception and air-flow resistance measurements were made using a Model TDA-100P available from Air Techniques, International of Owings Mill, Md. A circular sample of 5.3 inches in diameter was subjected to a monodispersion of 0.18 micron particles of a synthetic aliphatic hydrocarbon oil was used in the studies at a flow rate of 32 scfm.

Dry mixtures of about 6% by weight polyester fibers having a length of about 3.175 millimeters and a denier of about 45, 85% by weight 20×50 mesh coconut carbon, and 9% by weight binder particles comprising MICROTHENE® FN-510, were loaded onto a substrate at a lay down of about 370 grams/meter$^2$. Both the top and bottom substrates were a wet laid nonwoven material obtained from American Nonwovens Corp., of Columbus, Mo., and sold under the trade designation SRF5037B. The basis weight was 21 grams/yard$^2$. The composites had an air resistance of 0.23 mm H$_2$O on average. In comparison, composites with the same lay down made with the same coconut carbon and 9% by weight binder with a bottom substrate of REEMAY™ 2275 and a top substrate of REEMAY™ 2004, both available from BBA Nonwovens Reemay, Inc., of Old Hickory, Tenn., had an air resistance of 0.34 mm H$_2$O on average. By incorporating lofting fibers into the dry mixture, air resistance through the composite of the present invention is decreased by about 30%. Efficiency of the composites also increased when fibers were added such that the fiber containing composites had an efficiency of 17.28% on average while the comparative composites had an efficiency of 14.20% on average.

When a lay down of 450 grams/meter$^2$ was used to make the composites of the present invention, composites of the present invention that incorporated lofting fibers, had an air resistance of 0.38 mm H$_2$O on average, while composites without the lofting fibers had an air resistance of 0.43 mm H$_2$O on average. At this higher lay down, the lofting fibers provided a decrease in air resistance by about 12%. Efficiency of the composites also increased when fibers were added such that the fiber containing composites had an efficiency of 19.02% on average while the comparative composites had an efficiency of 17.78% on average.

Air permeability studies were conducted using a fabric penetration machine manufactured by Frazier Precision Instruments Company, Hagarstown, Md., at a pressure of 0.5 inches (12.7 millimeters) water column.

For the composites of the present invention with the lofting fibers having a lay down of 370 grams/meter$^2$, the Frazier air permeability was greater than about 200 scfm, whereas the comparative composite without fibers is about 155 to about 175 scfm.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A composite comprising:
    a discrete substrate having a first surface;
    a dry mixture on the first surface of said substrate, said dry mixture comprising active particles, binder particles, and lofting fibers having a denier of greater than 20,
    wherein said binder particles coalesce the active particles and the lofting fibers to each other and to said substrate.

2. A composite of claim 1 wherein said substrate comprises a nonwoven layer having an air permeability of greater than about 600 scfm.

3. A composite of claim 1 wherein said substrate comprises a wet laid nonwoven layer further including a latex binder.

4. A composite of claim 1 wherein the active particles comprise an adsorbent, an absorbent, or combinations thereof.

5. A composite of claim 1 wherein the active particles comprise activated carbon having an average particle size of about 20×50 mesh.

6. A composite of claim 1 wherein the lofting fibers have a denier greater than about 30.

7. A composite of claim 1 wherein the lofting fibers have a denier greater than about 45.

8. A composite of claim 1 wherein the lofting fibers are present in an amount of about 3 to about 12% by weight based on a total weight of the dry mixture.

9. A composite of claim 1 wherein the lofting fibers comprise polymers, metal, glass, ion-exchange resins, engineered resins, or combinations thereof.

10. A composite of claim 1 wherein the lofting fibers comprise polyester having a denier of about 45.

11. A fluid filtration system comprising the composite of claim 1.

12. A composite comprising:
    a discrete substrate having a first surface;
    a dry mixture deposited on the first surface of said substrate, said dry mixture comprising active particles, binder particles, and lofting fibers having a denier of greater than 20,
        wherein said composite is heated to a softening temperature of the binder particles, but below a melting temperature of the active particles and the lofting fibers, such that the softened binder particles coalesce the active particles and the lofting fibers to each other and to said substrate; and
    said composite having an air permeability of greater than about 200 scfm.

13. A composite of claim 12 wherein the active particles comprise an adsorbent, an absorbent, or combinations thereof.

14. A composite of claim 12 wherein the lofting fibers are present in an amount of about 3 to about 12% by weight based on a total weight of the dry mixture.

15. A composite of claim 12 wherein the lofting fibers comprise polymers, metal, glass, ion-exchange resins, engineered resins, or combinations thereof.

16. A composite of claim 12 wherein the lofting fibers comprise polyester having a denier of about 45.

17. A composite of claim 12 wherein said substrate comprises a wet laid nonwoven layer further including a latex binder.

18. A composite of claim 12 wherein the active particles comprise activated carbon having an average particle size of about 20×50 mesh.

19. A composite of claim 12 wherein the active particles have microbiological interception capabilities.

20. A fluid filtration system comprising the composite of claim 12.

* * * * *